United States Patent [19]

Appleby et al.

[11] 4,134,783

[45] Jan. 16, 1979

[54] TIRE BUILDING SYSTEM

[75] Inventors: Paul E. Appleby, Cuyahoga Falls; Christopher E. Christie, Akron; John H. Gerstenmaier, Akron; Thomas F. Minter, Akron; Edwin S. Woodhall, Cuyahoga Falls, all of Ohio

[73] Assignee: The Goodyear Tire & Rubber Company, Akron, Ohio

[21] Appl. No.: 833,796

[22] Filed: Sep. 16, 1977

Related U.S. Application Data

[63] Continuation of Ser. No. 696,610, Jun. 16, 1976, abandoned, which is a continuation of Ser. No. 266,884, Jun. 28, 1972, abandoned.

[51] Int. Cl.$^2$ ................. B29H 17/16; B29H 17/20
[52] U.S. Cl. ................. 156/396; 156/405 P; 156/417
[58] Field of Search ............... 156/110, 111, 123, 124, 156/126–129, 132, 133, 396, 405, 408–410, 414–417

[56] References Cited

U.S. PATENT DOCUMENTS

| | | | |
|---|---|---|---|
| 2,407,152 | 9/1946 | Haase | 156/111 |
| 2,936,813 | 5/1960 | Haase | 156/126 |
| 2,974,714 | 3/1961 | Kraft | 156/127 |
| 3,027,289 | 3/1962 | Gitzinger | 156/126 |
| 3,038,524 | 6/1962 | Bosomworth | 156/405 |
| 3,140,216 | 7/1964 | Shilts et al. | 156/415 |
| 3,212,951 | 10/1965 | Porter | 156/126 |
| 3,409,490 | 11/1968 | Pacciarini et al. | 156/128 |
| 3,455,764 | 7/1969 | Bryant | 156/128 |
| 3,475,254 | 10/1969 | Henley | 156/123 |
| 3,532,577 | 10/1970 | Niclas et al. | 156/396 |

Primary Examiner—John E. Kittle
Attorney, Agent, or Firm—R. S. Washburn

[57] ABSTRACT

A coordinated method and apparatus system for concurrently building an endless band and an endless inextensible belt, transferring the band coaxially of itself to a carcass forming and shaping drum, enfolding beads in inwardly turned ends of such band to form a carcass, then shaping the carcass while swinging the drum about a vertical axis to transfer the endless belt coaxially of itself and of the shaped carcass. The apparatus includes a band building drum with cooperating ply stock servicer for building the tire band and a belt building drum also with a cooperating servicer for supplying belt ply stock and, optionally, tread stock. Axes of the band drum and belt drum are disposed to intersect a vertical axis about which a turret mounted carcass forming drum swings into alternate coaxial alignment with the band building drum and the belt building drum.

2 Claims, 10 Drawing Figures

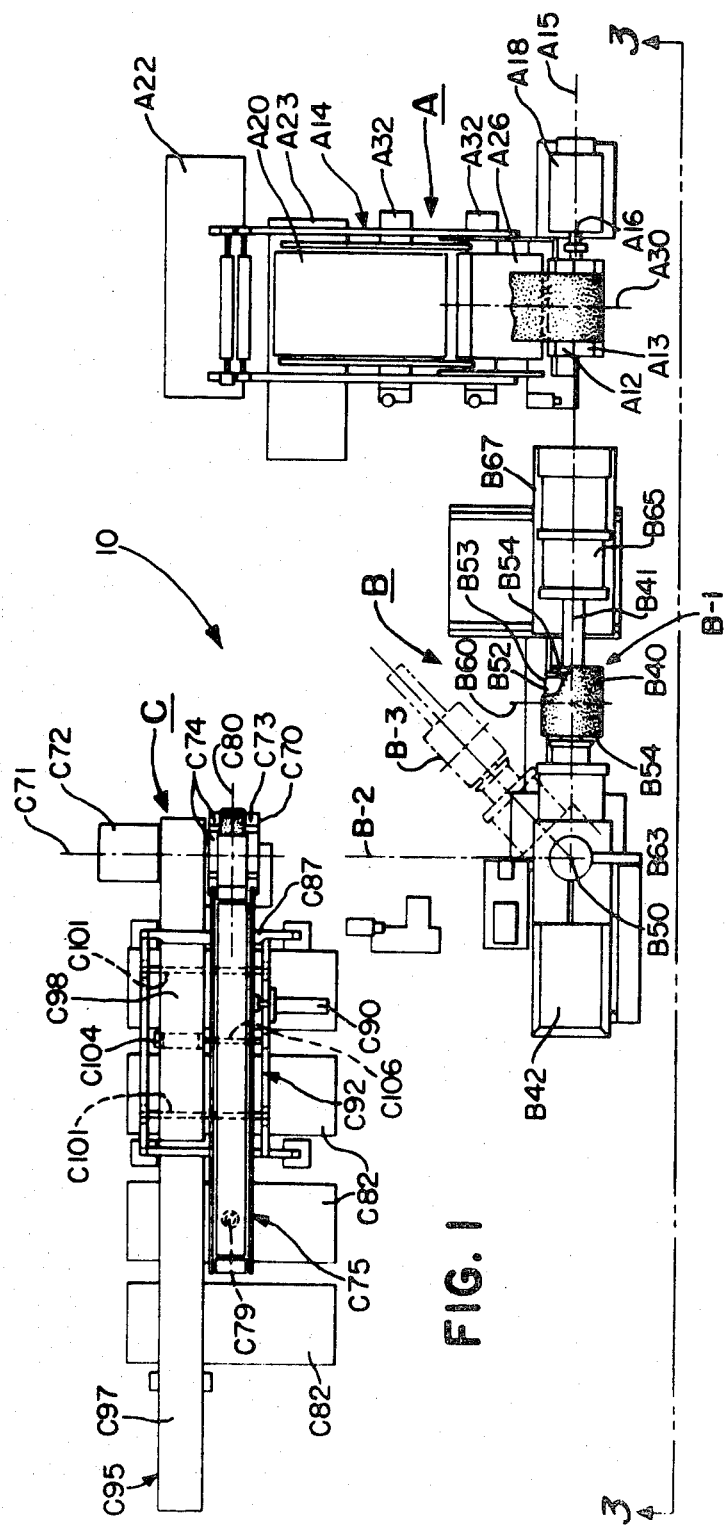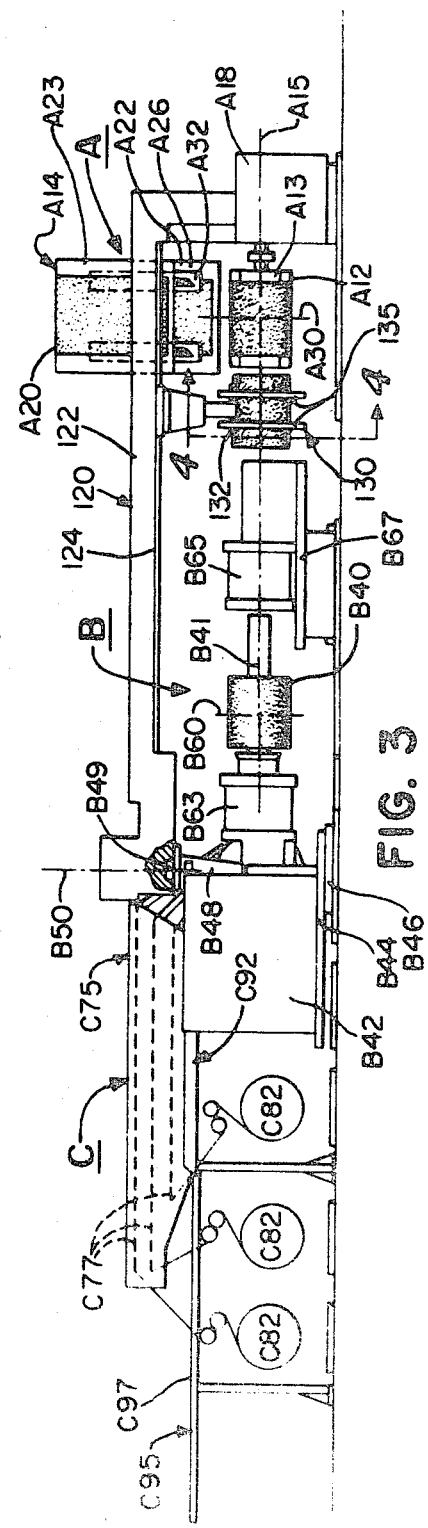

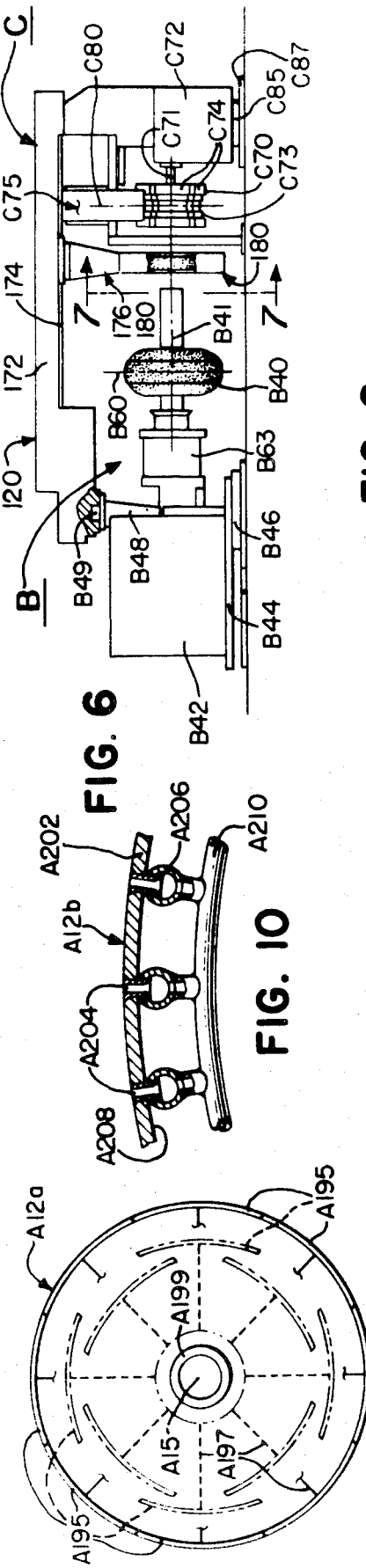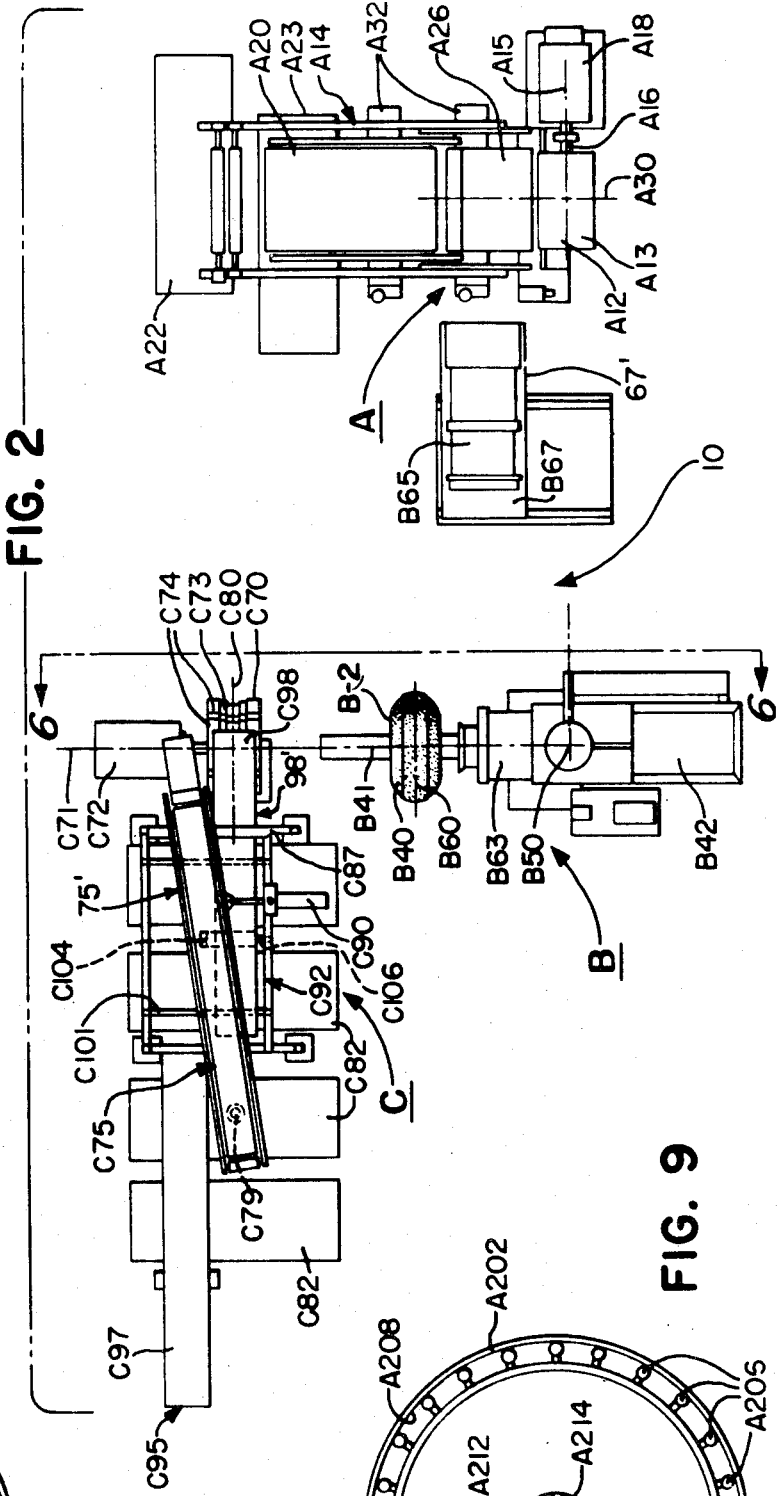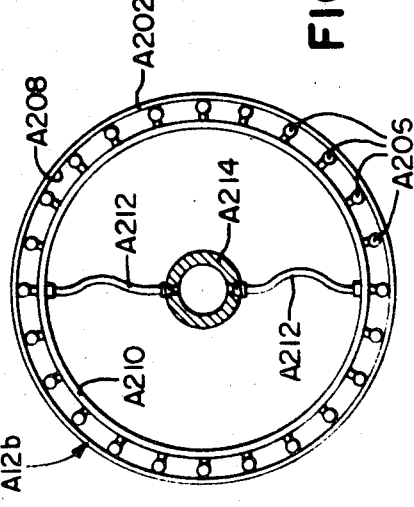

TIRE BUILDING SYSTEM

This is a continuation of application Ser. No. 690,610 filed June 16, 1976, which is a continuation of application Ser. No. 266,884 filed June 28, 1972 now both abandoned.

The foregoing abstract is not to be taken as limiting the invention of this application, and in order to understand the full nature and extent of the technical disclosure of this application, reference must be made to the accompanying drawing and the following detailed description.

This invention relates to building tires and particularly to improvements in rapidly and accurately building belted tires for trucks and like vehicles.

Heretofore, truck tires have been built commercially by methods and/or by apparatus similar to that employed in the manufacture of passenger car tires in which the ply or plies comprising the carcass are wrapped about a carcass-shaping drum, being then and there spliced into endless form while on the shaping drum. Alternatively, such tires have been constructed with bands spliced into endless form elsewhere and then worked telescopically over a carcass-shaping drum, being enlarged and/or distorted during such working into an appropriate axial location. In both known procedures, the physical limitations of the drum have prevented use of a satisfactory difference between the bead diameter of the tire being built and the diameter of the drum to which the carcass plies are applied. This difference in diameter is referred to commonly, and herein, as the crown of the building drum and is distinguished from the diameter of the crown portion of the ultimate tire.

The foregoing practices have led frequently to distortion of the ply or plies during application thereof, in either open length or endless form, to the drums heretofore used.

Hence, the present invention aims to provide for rapidly and accurately building tires, particularly of the class of tires suitable for motor trucks and like vehicles.

A further object of the invention is the provision of tire building apparatus capable of pre-forming an endless band in cylindrical form and of transferring such endless band, without change in the circumference or derangement of the cords of such band, into accurately concentric relation with a carcass-shaping drum while the latter is in a cylindrical stage or condition of lesser diameter than the band, and thereafter expanding the carcass-shaping drum into accurate concentric contact with the band.

The foregoing objects as well as other objects and advantages which will become apparent or be particularly pointed out in the description which follows, are accomplished according to the invention by a method comprising building, on a rigid cylindrical surface, an endless integral cylindrical band having a circumference intermediate the circumferences respectively of the beads and of the crown of said tire, supporting said band in fixed relation relative to its own cylindrical axis while releasing the band from said surface, translating the band coaxially and freely from said surface into concentric relation with a carcass-forming drum, the drum having a cylindrical form of lesser circumference than said band during said translating, and with the axial ends of said band extended outwardly of the ends of the drum, then expanding the drum sufficiently to engage uniformly the inner surface of the band, sweeping the ends of the band inwardly at the respective drum ends to form a radially extending shoulder at each drum end, setting inextensible bead core assemblies (referred to hereinafter as beads) in contact with the respective shoulders and turning the remaining ends of the band outwardly around the beads and the shoulders to form a carcass, then further expanding said drum and said carcass, while concurrently moving the drum ends and beads coaxially toward a mid-circumferential plane, into a toroidal shape while yet on said drum.

In a further aspect, the invention comprises building, concurrently with the foregoing steps, an endless integral circumferentially inextensible belt (as hereinafter defined) on a second rigid cylindrical surface apart from the first said surface, enclosing the belt within a cylindrical rigid, segmented ring disposed coaxially and concentrically thereof and collapsing inwardly the rigid surface, swinging the carcass-shaping drum angularly about a vertical axis, while shaping the previously formed carcass thereon from a cylindrical form toward its toroidal form, to dispose the rotation axis of the drum in line with the axis of the belt, translating the ring and the belt into concentric relation with the carcass on the drum, continuing to expand the carcass radially into uniformly concentric circumferential contact with the inward surface of said belt, disengaging said ring from the belt by moving the segments radially outwardly and the ring axially and again swinging the carcass-forming drum about the vertical axis while collapsing the drum for removal of the tire therefrom.

Further, in accordance with the invention, apparatus for the accomplishment of the foregoing method for constructing a tire comprises turret means rotatable about a vertical axis, carcass-shaping means mounted for rotation about a drum axis perpendicular to and intersecting said vertical axis, band building means mounted for rotation about a band axis perpendicular to and intersecting said vertical axis, belt building means mounted for rotation about a belt axis perpendicular to and intersecting both said vertical axis and said band axis, said turret means being selectively rotatable to align said carcass-shaping means coaxially with said band axis to accommodate transfer of a cylindrical tire band from said band building means to said carcass-shaping means and to align said carcass-shaping means coaxially with said belt axis to accommodate transfer of a cylindrical inextensible belt from said belt building means to said carcass-shaping means.

It is to be understood that the inextensible belt can be made of a single ply of cord or wire fabric or of a plurality of such plies suitably compacted to form a unitary belt. Preferably, although not necessarily, the structure referred to herein as the belt will also include one or more layers of rubber or rubber-like material to provide the tread of the tire being built.

In the description which follows, reference is made to the attached drawings illustrating a preferred embodiment of the invention described and claimed herein, said drawings including:

FIGS. 1 and 2 are plan views illustrating schematically a preferred apparatus in accordance with the invention;

FIG. 3 is a schematic elevation view of the apparatus of FIGS. 1 and 2 as indicated respectively by the line 3—3;

FIG. 6 is a schematic elevation view as indicated by 6—6 in FIG. 2;

Figure 5:
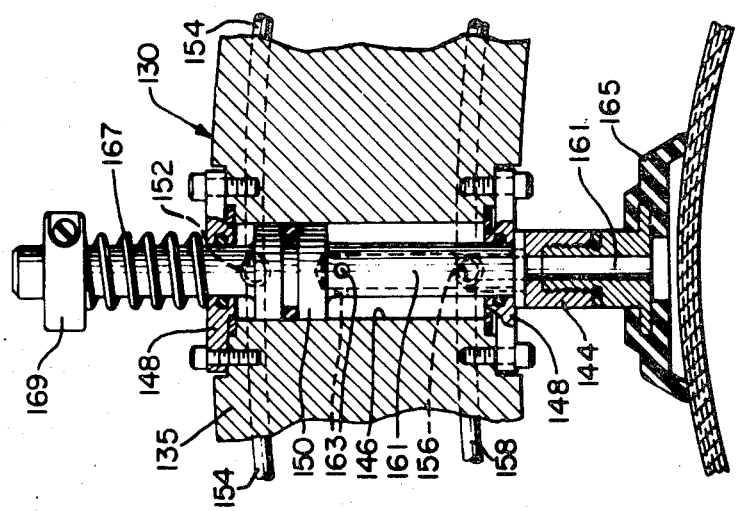
FIG. 5 is an enlarged view of the section 5—5 in FIG. 4.

FIGS. 8 and 9 are views in elevation of alternative forms of band building drums of the apparatus of FIGS. 1 and 2, with reference to the section line 4—4 of FIG. 3; and FIG. 10 is a sectional view of an enlarged portion of the drum of FIG. 9.

With reference to FIG. 1; the system 10 comprises an apparatus A for building an endless integral tire band, an apparatus B to which the band is transferred, and which apparatus serves to form a tire carcass, to reposition the tire carcass and to shape the carcass into toroidal form. The system includes also an apparatus C for building an endless inextensible belt which is transferred into concentric relation with the tire carcass formed and shaped by apparatus B.

Apparatus A comprises a band building drum A12 and a servicer system A14 for the supply of band building stock to the drum A12. The band building drum provides an axially and circumferentially continuous rigid cylindrical surface A13 corotatably mounted about an axis A15 on a spindle A16 carried as a cantilever upon suitable bearings (not shown) in the housing A18. The housing A18 is a rigid floor mounted structure extending upwardly to provide suitable support for an overhead bridge structure, omitted from FIGS. 1 and 2, and to be described presently. The servicer system A14 includes a plurality of stock conveyors A20 each of which carries a running length of band building stock from an associated one of the conventional letoffs A22,A23 to the drum A12. Each of the conveyors A20 includes an articulated movable end portion A26 capable of movement toward and away from the drum A12 in directions parallel to the mid-circumferential plane A30 in order to provide clear space around the drum to accommodate movement of band transfer means axially thereover. Additional letoffs A32 are associated cooperatively with the servicer A14 to provide bead chafer strips and the like.

The apparatus B includes a carcass forming and shaping drum B40 mounted for rotation about an axis B41 on a corotatable spindle (not shown) which is carried as a cantilever by suitable bearings (not shown) mounted within the housing B42. Housing B42 is carried on a rotatable plate or turntable B44 which is in turn supported on a large diameter lower bearing means B46. The housing includes a column B48 which carries an upper bearing B49 located coaxially of the bearing B46 and of a vertical axis B50 about which the apparatus B is rotatable between the position B-1 thereof indicated in FIG. 1 wherein the axis B41 is collinear with the axis A15, through an angle of 90 degrees, and a second position B-2 discussed further below. The latter position is illustrated in FIG. 2. In an intermediate position B-3 of the apparatus B, the drum B40 can be collapsed for removal of the tire.

The carcass drum B40 is a multicondition drum capable of collapse to a condition smaller in diameter than the bead diameters of the tire, of an expanded intermediate condition wherein the elastomeric tubular sleeve B52 providing the exterior cover of the drum is firmly supported providing a circumferentially and axially continuous surface B53 terminating in radially inwardly extending shoulders B54, and a toroidal condition (FIG. 2) wherein the sleeve is radially expanded and the shoulders moved coaxially nearer to the mid-circumferential plane B60.

A bead sweepdown, beadsetting, and turnup mechanism B63 is mounted coaxially of the drum between the housing B42 and the drum. A second and substantially identical bead sweepdown, beadsetting, and turnup mechanism B65 is mounted on a carriage B67 for movement coaxially of and toward and away from the drum B40. The mechanisms B63 and B65 cooperate with the drum B40 to sweep the overhanging edges of a band inwardly, to place inextensible bead rings against the exterior of the band supported on the shoulders B54 and to turn the band ends radially outwardly about the beads in a well-known manner.

The carriage B67 is mounted for movement normal to the common axis A15–B41 between the coaxial position just described and a parked position 67' as seen in FIG. 2.

Apparatus C includes a belt building drum C70 which is mounted for coaxial rotation about the axis C71 on a spindle (not shown) carried as a cantilever by suitable bearings (not shown) mounted within the housing C72. The housing is a rigid structure supported on the floor and extending upwardly to support the overhead bridge structure to be described presently.

The drum C70 provides a rigid cylindrical surface C73 on which an endless inextensible belt can be built up of a plurality of belt plies. The plurality of radially movable segments C74 forming the drum are retractable inwardly of the surface C73 to release the belt for its transfer axially off the drum C70.

Apparatus C also includes a ply stock servicer C75 which comprises a plurality of belt ply stock conveyors C77 extending parallel to the mid-circumferential plane C80 of the drum C70, arranged one above the other and each adapted to convey an individual ply component to the drum C70 from a respectively associated one of the supply rolls C82. The servicer C75 is mounted on a pivot C79 and supported by the guide track C87. An air cylinder C90 or equivalent motive device is connected to the fixed support structure C92 to swing the servicer C75 from the position shown in FIG. 1, parallel and symmetrical with the midplane C80 and a second position 75' as illustrated in FIG. 2, displaced angularly about the pivot C79. Apparatus C also includes a tread servicer C95 having a storage conveyor C97 and a delivery conveyor C98. The delivery conveyor is supported on parallel rails C101 of the structure C92 and is movable thereon in directions parallel to the axis C71. An air cylinder C104 mounted on the support structure is connected by its piston rod C106 to shift the delivery conveyor C98 laterally between the position shown in FIG. 1, parallel to and laterally offset with respect to the drum C70, and the position 98' illustrated in FIG. 2 located symmetrically of the plane C80.

Figure 4:
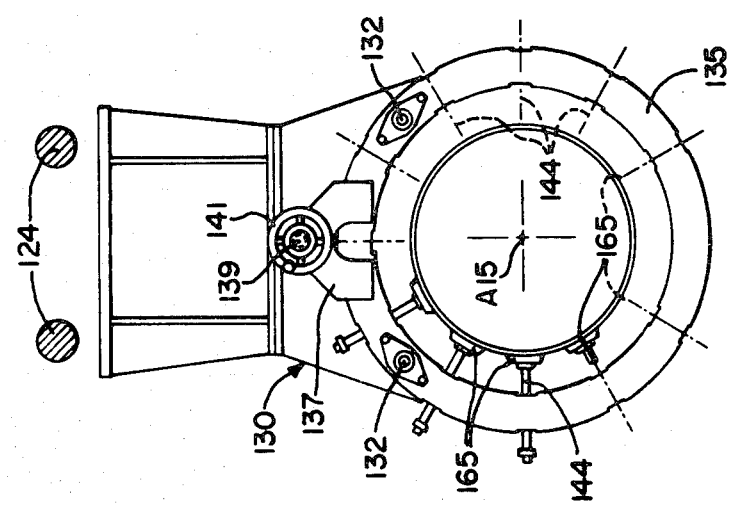
FIG. 4 is a section view indicated at 4—4 in FIG. 3.

Referring to FIGS. 3 and 4; the previously mentioned overhead support structure 120 includes the bridge 122 which is carried by and extends between the bearing B49 of the apparatus B and the housing A18 of the apparatus A. A pair of parallel rails or bars 124 are supported rigidly by the bridge and extend parallel to and above the common axis B41–A15 to provide track means on which the band transfer carrier 130 is mounted for movement parallel to the band axis A15.

A pair of parallel slide rods 132 fixed to the transfer carrier 130 support a pair of coaxial band transfer rings 135 concentrically with respect to the band axis A15. Each ring 135 has an extension 137 with a hole therein parallel to the axis A15 threaded as a nut, with righthand threads in one and lefthand threads in the other of the extensions. A screw 139 threaded right and lefthand is fixed rotatably in the carrier with the respective threads engaging the corresponding threads in the extensions 137 such that by rotation of the handwheel 141 the rings are coaxially slidably adjustable toward and away from each other. Each ring 135 carries a plurality of radially movable plungers 144 spaced angularly about and extending radially through the ring and inwardly and outwardly thereof.

Referring particularly to FIGS. 4 and 5; each of the plungers 144 extends coaxially through a cylinder 146, the respective inward and outward ends of which are closed by the gland caps 148 surrounding and supporting the plunger for radial movement. Each plunger has a piston 150 formed integrally therewith which is slidable in the respective cylinder between the caps. At the radially outer ends of each cylinder an air port 152 communicates pressurized air from a supply conduit 154 connected through a manual valve (not shown) to conventional air pressure supply means. At the radially inner end of the cylinder a port 156 connects the cylinder with a suction conduit 158 connected through a manual valve (not shown) to a vacuum pump. Each of the plungers 144 has a longitudinal bore 161 extending outwardly from the radially inner end of the plunger and opened into the cylinder radially inwardly of the piston 150 by way of the crossports 163 so that partial vacuum is communicated through the port 156 into the cylinder 146 and through the crossports 163 into the longitudinal bore 161. A hollow and yieldable pad or cup 165 is secured on the radially inner end of each respective plunger 144 for engagement with the exterior surface of a band. The band is held in contact with the pad 165 by the reduction below atmospheric of the air pressure within the pad and the longitudinal bore 161.

On the radially outwardly extending portion of the plunger 144 a helical compression spring 167 acts between the outer gland cap and adjustable conventional stop collar 169 to urge the plunger radially outwardly and alternatively to limit the radially inward movement of the plunger under the influence of air pressure acting on the piston 150.

The carrier 130, the rings 135, and the associated elements described form band transfer means movable along the track means from its parked position shown in FIG. 3 toward the right to a position concentric with the band building drum A12 and to the left to a position concentric with the carcass-shaping drum B40. The term concentric as used herein means not only radial concentricity with respect to the drum axis but also symmetry with respect to the mid-circumferential plane of the particular drum. It is particularly to be noted that the band transfer means when located in the parked position according to FIG. 3 is spaced both from the band building drum A12 and from the mechanism B65 so that a completed band can be held therein without interference either with the mechanism B65 or with the band building drum A12. The particular advantages of this feature will be pointed out in greater detail subsequently herein.

Referring now to FIGS. 2 and 6; the overhead structure 120 includes also a bridge 172 connecting the apparatus B with the apparatus C and extending between and supported by housing C72 and the bearing B49. A pair of rails or bars 174 (best shown in FIG. 7) are fixed in the bridge 172 and extend parallel to and above the belt axis C71. When the drum B40 and its rotational axis B41 are in the position designated B-2 hereinabove, the axis B41 is collinear with the axis C71 and may be referred to as a common axis B41-C71.

A belt transfer carrier 176 is slidably supported on the bars 174 for movement from a parked position as illustrated in FIG. 6 toward the right as seen in FIG. 6 to a position concentric with the belt building drum C70 and to the left as seen in FIG. 6 to a position concentric with the drum B40 and a tire carcass thereon. In the parked position illustrated in FIG. 6, the belt transfer means and a completed belt carried therein is spaced axially from the drum C70 and from the drum B40 sufficiently not to interfere with operation of either drum.

Figure 7:
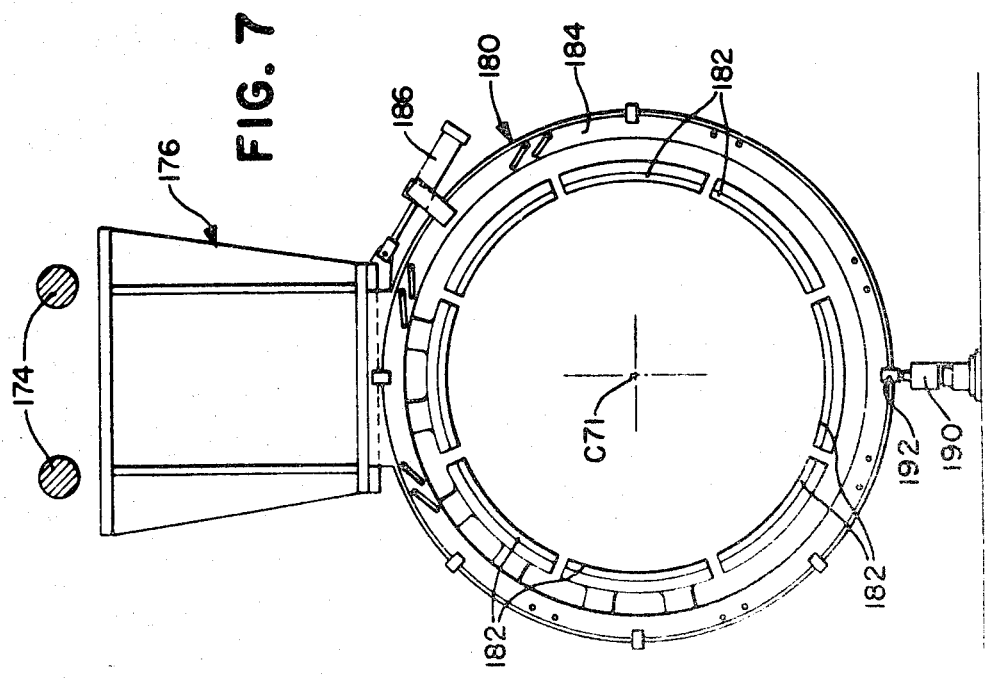
FIG. 7 is a sectional view of a feature of the apparatus of FIGS. 1 and 2, with reference to the line 7—7 in FIG. 6.

Referring also to FIG. 7; a rigid ring 180 is affixed to the carrier 176 to support a plurality of segments 182 coaxially of the belt axis C71 for movement radially thereof. The segments 182 are moved by a mechanism including an actuating ring 184 which is carried by the ring 180 for coaxial rotation in response to operation of the air cylinder 186 to move the segments 182 inwardly and outwardly with respect to the axis. The iris mechanism shown in FIG. 7 is well known and outside the scope of the present invention.

Better to insure parallelism and symmetry of the belt and transfer means with respect to the mid-circumferential planes C80 and B60, a conventional shot pin mechanism C190 is located on the floor or base plate immediately beneath the drum C70, and an identical shot pin mechanism is placed beneath the drum B40 each in the respective plane A30 or B60, and in the vertical plane of the common axis B41-C71. The respective shot pins are engageable with a recess 192 formed in the ring 180.

With reference to FIGS. 8 and 9; the band building drum A12, according to the invention, takes two alternative forms shown in the respective FIGS. 8 and 9. The drum form A12a comprises a plurality of segments A195 movable radially of the axis A15. The segments are moved radially by links A197 each connecting a respective segment to the central shaft A199 of the drum in a well-known manner. The movement of the segments inwardly separates the band building surface provided by the segments from the band while the latter is held in the band transfer rings 135.

The band building drum form A12b illustrated in FIGS. 9 and 10 has its band building surface provided by an integral rigid cylindrical shell A202 having therein a multiplicity of small orifices A204 arranged in axial rows and circumferential columns. The orifices are provided by hollow rivets by which a plurality of distribution tubes A206 are attached to the inner surface A208 of the cylindrical shell, which tubes in turn are connected with an air pressure manifold A210 in the form of an endless circular tube mounted within the drum and connected by flexible tubing connectors A212 to suitable air passages provided within the center shaft A214.

When completed, an endless tire band is released from the surface of the drum by flowing air under pressure between the inner surface of the band and the outer surface of the drum A12b. The small change of radial dimension effected by the pressure of the flowing air does not significantly distort the band and permits the same to be removed by the band transfer means without necessity for collapsing the band building drum as done in the drum modification A12a.

The operation of the apparatus described hereinabove is begun with the band building drum cylindrical surface A13 fixed at a diameter corresponding to the required internal diameter of the band, for example, a diameter from 15 to 25 percent greater than the diameter of the beads of the tire to be built. One or more elements providing bead chafers are wrapped about the drum in the appropriate axial locations. The extendable portion of the liner conveyor A20 is moved close to the drum A12 to deliver a length of liner stock which is wound one or more times about the drum to form an endless carcass liner. This conveyor A20 is retracted away from the drum, and a second conveyor portion A26 is extended toward the drum to deliver a length of cord ply stock which is wound about the drum, and spliced to form an endless ply band. A second ply can be wound in like manner. While the ply or plies used may be of any cord reinforcing material with such cords disposed at any suitable angles relative to the running length of the ply stock, in the apparatus and method particularly described herein, such ply comprises metallic wire cables disposed at least approximately parallel to the axis A15 and forms the ply of a radial tire. Optionally, additional components may be applied and wound about the first ply and spliced. The completed band is then stitched in a conventional manner by a stitching mechanism (not shown).

After the band is completed, the band transfer rings 135 are moved from the parked position as seen in FIG. 3 toward the right coaxially of the drum and positioned concentrically therewith. By "concentrically" is meant that the pair of rings 135 are disposed coaxially of the drum and symmetrically with respect to the mid-circumferential plane A30 of the band. The radial plungers 144 are moved radially inwardly to bring the pads 165 into surface contact with the band while the latter is yet firmly supported by the drum surface A13. Adjustably fixed stops 169 on each of the plungers ensure that the pads are thereby positioned so as not to change any radial dimension of the band. The hollow pads are then connected to the vacuum line 158 by which the band is temporarily secured to the pads and held immobile radially.

When the pads are engaged with the band as described, the band is then released from the surface of the drum. This release may be accomplished by moving each of the plurality of drum segments A195 (FIG. 8) radially inwardly with respect to the band building surface. Alternatively, according to the previous description of the apparatus, the drum surface may have a multiplicity of orifices A204 (FIG. 9) through which pressurized air can be caused to flow between the band building surface and the inward circumferential surface of the band. The change of radial dimension of the band due to the presence of the film of air between the band and the drum surface is not significant. When the band is released from the drum surface by either of the described procedures, the transfer rings 135 are moved coaxially to the left as seen in FIG. 3 to position the transfer means and the band therein in the parked position.

According to the invention, a belt for the tire is built concurrently with the building of the band as has been described. The advantages in economy and efficiency will be apparent in that the capacity of the apparatus will be better utilized. The operation of building the belt, which as previously indicated can and preferably will include a tread as a part of the assembly referred to herein as a belt, is begun by setting the drum C70 to a diameter corresponding to the desired crown diameter of the shaped carcass.

The belt ply server C75 is then moved into position in alignment with the mid-circumferential plane C80 and energized to deliver the elements of a first belt ply which are then wound about the drum and spliced in a conventional manner. The servicer then successively delivers a second belt ply element, and if used, a third and additional ply elements, each of which is spliced conventionally and the so assembled belt is then stitched by a conventional stitching mechanism (not shown).

The belt ply server is then shifted into its angular disposition with respect to the mid-circumferential plane C80 (FIG. 2).

A tire tread in the form of an extruded slab of rubber or rubber-like material, having been held in readiness on the tread storage conveyor C97, is now advanced to the tread delivery conveyor C98 which is then shifted laterally into alignment with the mid-circumferential plane C80. From the delivery conveyor, the tread is advanced to and wound about the belt on the drum C70 and spliced in a conventional manner, whereupon the tread and belt assembly are stitched by the stitching mechanism. The tread delivery conveyor C98 is again laterally shifted axially with respect to the drum C70 into alignment again with the tread storage conveyor C97 in readiness to receive the tread for a next subsequent tire.

The belt transfer ring 180, the segments thereof having been moved radially outwardly, is then moved from its parked position as seen in FIG. 6, into a position of concentricity relative to the drum C70. Concentricity as used herein means that the ring is moved coaxially into position disposed symmetrically as well with respect to the mid-circumferential plane C80. The segments 182 of the ring are then moved inwardly to close the circumference formed by the inward surfaces of the segments and closely engage the tread and belt assembly, termed herein, the belt. While the belt is held securely by the segments of the ring, the segments C74 are moved radially inwardly relative to the belt building surface, and the transfer ring 180 is then moved to the left as seen in FIG. 6 to its parked position.

Preferably, and in accordance with the invention, operations associated with the carcass-shaping drum B40 will have been continuing concurrently with the previously described operations of building both the band and the belt. A previously built tire having been removed from the drum B40 in its collapsed condition for such removal at the position B-3 indicated, inextensible bead assemblies, herein termed beads, are placed in the respective bead-setters of the mechanisms B63,B65 and the drum is swung into coaxial relation with the band axis A15 and there locked. The band transfer rings 135 are then moved to the left as seen in FIG. 3, to the position concentric with the drum B40. When complete axial registry is obtained, and there is no relative axial movement between the band and the drum, the drum B40 is expanded into its second condition wherein the band is coaxially engaged and is expanded slightly, for example, from about 0.1 to about 5 percent in diameter. The plungers 144 are thereby moved outward freely, the air pressure acting on the pistons 150 as well as the vacuum connection to the pads 165 are valved off and the band is secure on the drum. The band transfer rings are returned to the parked position.

The carriage B67 and the swab-down, beadset and turnup mechanism B65 carried thereby are moved from the parked position 67' as seen in FIG. 2 to an operative position as seen in FIG. 1 in coaxial alignment with the drum B40 and thence into supporting relation therewith. The mechanisms B63, B65 are both advanced, a plurality of sweep-down fingers encompassing the ply endings are moved radially inwardly and the respective beads placed concentrically in engagement with the outward surface of the band. The fingers are then retracted and the ply endings turned radially outwardly to envelop the beads and to stitch the ply endings firmly against the plies extending between the beads. The sweep-down, beadset and turnup mechanisms are then moved axially away from the drum, the mechanism B65 remaining in the coaxial and supporting relation with the drum. Additional components as required, for example, lower sidewall strips and/or shoulder wedges, can be wound circumferentially about the now formed carcass at this stage.

After the carcass in its cylindrical form has been completed, the mechanism B65 and carriage B67 are returned to their parked position as seen in FIG. 2. The housing B42 is released and the drum B40 is swung to its second position B-2, that is, with its rotational axis B41 coaxially aligned with the belt building drum axis C71. Preferably, the drum B40 is actuated to begin shaping the carcass concurrently with its angular movement about the vertical axis B50 by moving the respective beads axially toward one another while fluid pressure entering the sleeve B52 expands the same radially. The drum B40 is then locked in coaxial relation with the belt axis C71, automatically. The belt transfer ring 180 with the belt therein is moved from its parked position to a position concentric with the carcass-shaping drum B40 and is brought positively to full stop in relative axial register before any contact occurs between the carcass and the belt. Shaping of the carcass continues, its radial expansion engaging the crown of the carcass with the belt simultaneously along the mid-circumferential centerline thereof. The segments 182 are then moved radially outwardly free and clear of the tread, and the transfer ring 180 is moved to the right as seen in FIG. 6 to its parked position. The belt and tread are stitched in a usual manner to unite the belt with the carcass. At this stage, additional components as required, for example, sidewall or veneer strips, at the shoulder, overlying the tread, may be applied. After the tire is completed, the turret B42 is released and swung to a position B-3 of about 45° as illustrated in FIG. 2 while concurrently collapsing the drum to release the tire. The tire is then removed ready for subsequent operations inluding the curing thereof.

From the foregoing, it will be apparent that the apparatus and method can be utilized by three cooperating tire builders each performing a part of the operation associated respectively with the band building drum, the belt building drum, and the carcass shaping drum. It is believed to be apparent also that the operation can be carried out by two tire builders each of whom performs the portions of the operation associated with one of the two operative axes, namely, the band building axis C71 and the belt building axis A15.

A particular advantage is obtained in the relative flexibility of the operation in that a completed band can be held by the transfer means in a parked position, permitting other operations including the building of a second band to proceed without interference. The same is true of the belt building operation in that a belt and tread assembly can be held in readiness in the parked position of the belt transfer means without interference with the building of a second belt or with the carcass-shaping drum operations.

While certain representative embodiments and details have been shown for the purpose of illustrating the invention, it will be apparent to those skilled in the art that various changes and modifications may be made therein without departing from the spirit or scope of the invention.

We claim:

1. Apparatus for building a radial ply tire having a given bead diameter and a given toroidal crown diameter comprising a solitary band building drum having a fixed non-collapsible continuous cylindrical surface; means permanently fixed mounting said band building drum for rotation about an axis fixed in space, said band building drum having a plurality of closely spaced orifices distributed in rows and columns along and around said cylindrical surface, and airflow means mounted within said drum connected to flow air under pressure through said orifices between the inner surface of a cylindrical precarcass band on said drum and the outer cylindrical surface of said drum; solitary carcass-shaping means providing three diametral conditions including a first condition being of less diameter than said bead diameter and an intermediate condition providing an axially and circumferentially firm and continuous cylindrical support surface having a diameter materially larger than the diameter of said band building drum and having a radially inwardly extending shoulder at each axial end of said support surface, means mounting said carcass-shaping means for coaxial alignment and axially spaced apart relation with respect to said band building drum; and band transfer means cooperable with said orifices and said airflow means to release a precarcass band from said drum and operable to carry said precarcass band between said drum and said carcass-shaping means without change in its cylindrical form and size as built on said drum and having three predetermined positions, said band transfer means comprising a pair of coaxial rings, means mounting the respective said rings for movement symmetrically toward and away from each other, each ring having a plurality of radially movable plungers spaced angularly about and extending radially through the respective ring and movable inwardly and outwardly thereof, a piston means mounted on each plunger and responsive to air pressure thereon to urge said plungers radially inwardly relatively of said rings, yieldable cup means secured on the radially inner end of each plunger for engagement with the exterior surface of said precarcass band, adjustable stop means on each said plunger outwardly of the respectively associated ring limiting radially inward travel of said plungers to dispose said cup means in fixed closely spaced radial relation with said drum, said cup means being sufficient in number and in location to support said precarcass band in cylindrical shape and size substantially identical to its cylindrical shape and size when on said band building drum while being moved from the first to the intermediate and from the intermediate to the third of said three positions, said plungers being displaceable radially outwardly in response to expansion of said carcass-shaping means from said first condition to said intermediate condition thereby to expand a central portion of a band placed by the transfer means around the shaping means.

2. Apparatus as claimed in claim 1, wherein said means mounting said carcass-shaping means comprises means for angularly moving said carcass-shaping means about a vertical axis out of said coaxial alignment with respect to said band building drum and for concurrently moving said radially inwardly extending shoulders coaxially toward one another for changing a carcass thereon from a cylindrical to a toroidal form during angular movement of said carcass-shaping means.

* * * * *

UNITED STATES PATENT AND TRADEMARK OFFICE
CERTIFICATE OF CORRECTION

PATENT NO. : 4,134,783
DATED : January 16, 1979
INVENTOR(S) : Paul E Appleby, Christopher E Christie, John H Gerstenmaier, Thomas F Minter, Edwin S Woodhall It is certified that error appears in the above-identified patent and that said Letters Patent are hereby corrected as shown below:

Col. 1, line 1, "690,610" should read -- 696,610 --.

Signed and Sealed this

Seventh Day of August 1979

[SEAL]

Attest:

Attesting Officer

LUTRELLE F. PARKER

Acting Commissioner of Patents and Trademarks